United States Patent
Zahn et al.

(10) Patent No.: US 8,589,451 B1
(45) Date of Patent: Nov. 19, 2013

(54) SYSTEMS AND METHODS FOR GENERATING A COMMON DATA MODEL FOR RELATIONAL AND OBJECT ORIENTED DATABASES

(75) Inventors: Tobias Zahn, Stuttgart (DE); Steffen Geissing, Walldorf (DE)

(73) Assignee: SAP AG, Walldorf (DE)

( * ) Notice: Subject to any disclaimer, the term of this patent is extended or adjusted under 35 U.S.C. 154(b) by 0 days.

(21) Appl. No.: 13/480,279

(22) Filed: May 24, 2012

(51) Int. Cl.
*G06F 17/30* (2006.01)

(52) U.S. Cl.
USPC .............................. 707/803; 707/790; 707/698

(58) Field of Classification Search
USPC .................... 707/698, 803, 802, 790; 717/109
See application file for complete search history.

(56) References Cited

U.S. PATENT DOCUMENTS

| | | | |
|---|---|---|---|
| 5,499,371 A * | 3/1996 | Henninger et al. | 717/108 |
| 5,734,887 A * | 3/1998 | Kingberg et al. | 1/1 |
| 5,826,077 A * | 10/1998 | Blakeley et al. | 1/1 |
| 6,016,497 A * | 1/2000 | Suver | 1/1 |
| 7,454,367 B2 * | 11/2008 | Yu et al. | 705/26.8 |
| 7,917,534 B2 * | 3/2011 | Demiroski et al. | 707/790 |
| 8,161,081 B2 * | 4/2012 | Kaufman et al. | 707/802 |
| 8,185,867 B2 * | 5/2012 | Robinson | 717/109 |
| 2004/0073565 A1 * | 4/2004 | Kaufman et al. | 707/101 |
| 2005/0021557 A1 * | 1/2005 | Brendle et al. | 707/103 R |
| 2010/0036862 A1 * | 2/2010 | Das et al. | 707/101 |
| 2012/0191760 A1 * | 7/2012 | Kaufman et al. | 707/802 |

* cited by examiner

*Primary Examiner* — Jean M Corrielus

(74) *Attorney, Agent, or Firm* — Fountainhead Law Group PC

(57) ABSTRACT

In one embodiment, a computer-implemented method comprises receiving a query in a controller. A data store stores data in a relational database. The database comprises a plurality of fields and a plurality of data elements. Each field is associated with a portion of the data elements. The database is arranged as at least one table, and the query identifies data of an object to be stored in a data set. The method further comprises determining, by the controller, whether the relational database includes a field associated with a class of the object; and if the relational database does not include a field associated with the class of the object, adding a column to the relational database, the added column having a field corresponding to the class. The method further comprises adding the data of the object to the relational database.

20 Claims, 7 Drawing Sheets

| Employee No | Depart | Name | ... | Pay Grade | Title | Union Status |
|---|---|---|---|---|---|---|
| 100001 | 10 | Jane Doe | ... | P-2 | Dir. | ... |
| 100001 | 20 | John Doe | ... | P-2 | Dir. | ... |
| 100002 | 10 | Janet Jones | ... | P-5 | VP | ... |
| ... | ... | ... | ... | | ... | ... |
| 100100 | 10 | Bob Smith | ... | P-5 | VP | ... |
| 100101 | 20 | Tim Thomas | ... | S-1 | Tech | Member |

Table 200

*Fig. 2*

SYSTEMS AND METHODS FOR GENERATING A COMMON DATA MODEL FOR RELATIONAL AND OBJECT ORIENTED DATABASES

BACKGROUND

The present invention relates to computing, and in particular, to systems and methods for generating a common data model for relational and object-oriented databases.

Most commercially used programming languages are object-oriented languages or have similar features. Many programs written in such languages make heavy use of databases and could not function without them. However, most common database systems are relational databases. Although mapping data stored in objects to relational database systems is widely discussed, such mapping has performance issues or a negative influence on software design.

One problem associated with using object databases that it is not always possible to use them because object databases tend to be slow and are not widely accepted. It is generally desirable to use multiple databases of different types. However, object databases typically are not compatible with existing relational database software. Consequently, there exists a need for improved systems and methods for using relational and object-oriented databases. The present invention addresses this problem, and others, by providing systems and methods for generating a common data model for relational and object-oriented databases.

SUMMARY

Embodiments of the present invention include systems and methods for performing direct reporting access to transactional data stores. In one embodiment, the present invention includes a computer-implemented method comprising receiving a query, in a controller, wherein a data store stores data in a relational database. The database comprises a plurality of fields and a plurality of data elements. Each field is associated with a portion of the data elements. The database is arranged as at least one table, and the query identifies data of an object to be stored in a data set. The method further includes determining, by the controller, whether the relational database includes a field associated with a class of the object; and if the relational database does not include a field associated with the class of the object, adding a column to the relational database, the added column having a field corresponding to the class. The method further includes adding the data of the object to the relational database.

In one embodiment, the at least one table is a single table including all objects.

In one embodiment, the at least one table includes a main table and at least one partition table for each sub-class of a class of the main table.

In one embodiment, the at least one table includes a partition table for each sub-class of said at least one partition table.

In one embodiment, the at least one table includes a partition table for each sub-class of said at least one partition table, said partition table includes columns of said at least one partition table.

In one embodiment, the partition table for each sub-class of said at least one partition table and includes at least one additional column.

In one embodiment, the method further includes determining whether a first table of the at least one table has a size that exceeds a threshold; and generating at least one partition table for each sub-class of the first table if the size of the first table exceeds the threshold.

In one embodiment the method further includes generating a bit vector indicative of whether an element of the table belongs to the class.

In one embodiment, the method further includes compressing columns of the at least one table.

In one embodiment, the method further includes indexing the at least one table.

In one embodiment, the added column is based on the inheritance of the class.

In one embodiment, the database is arranged as at least one table in a column store format.

In another embodiment, the present invention includes a computer readable medium embodying a computer program for performing a method and embodiments described above.

In another embodiment, the present invention includes a computer system comprising one or more processors implementing the techniques described herein. For example, the system includes a controller that receives a query. A data store stores data in a relational database. The database comprises a plurality of fields and a plurality of data elements. Each field is associated with a portion of the data elements. The database is arranged as at least one table. The query identifies data of an object to be stored in a data set.

The controller determining whether the relational database includes a field associated with a class of the object. If the relational database does not include a field associated with the class of the object, the controller adds a column to the relational database, the added column having a field corresponding to the class. The controller adds the data of the object to the relational database.

The following detailed description and accompanying drawings provide a better understanding of the nature and advantages of the present invention.

BRIEF DESCRIPTION OF THE DRAWINGS

FIG. 2 illustrates an example table for a single table data store according to an embodiment of the present invention.

DETAILED DESCRIPTION

Described herein are techniques for generating a common data model for relational and object-oriented databases. The apparatuses, methods, and techniques described below may be implemented as a computer program (software) executing on one or more computers. The computer program may further be stored on a computer readable medium. The computer readable medium may include instructions for performing the processes described below. In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

Figure 1:
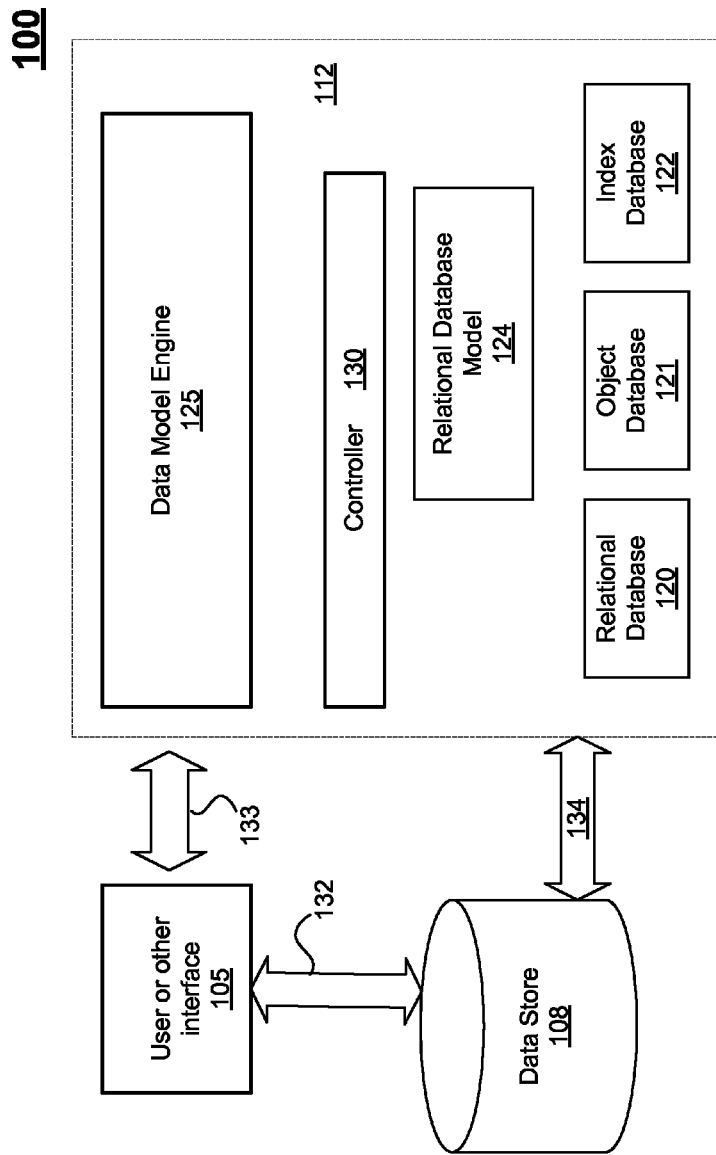
FIG. 1 is a schematic representation of a system for generating a common data model for relational and object-oriented databases according to an embodiment of the present invention.

FIG. 1 is a schematic representation of a system 100 for generating a common data model for relational and object-oriented databases according to an embodiment of the present invention. System 100 includes a user or other interface 105, a data store 108, and a data modeling system 112. In the following description, the term "data store" is used interchangeably with "database." Data store 108 may comprise one or more data stores. Data modeling system 112 comprises a relational database 120, an object database 121, an index database 122, a relational database model 124, a data modeling engine 125 and a controller 130.

Information is conveyed between user interface 105, data store 108, and data modeling system 112, along data flow paths 132, 133, and 134. For example, data modeling system 112 accesses the contents of database 108 over data flow path 134 when combining data.

Relational database 120 and object database 121 are sets of data that are stored in database 108 and accessed by data modeling system 112. Object database 121 stores data based on objects. The objects may be defined by a class, sub-classes, and inheritance between classes and sub-classes. Index database 122 comprises an index of relational database 120 and object database 121 for facilitating searching. Data modeling engine 125 executes a process or algorithm that analyzes data from relational database 120, object database 121 and index database 122 and generates relational database model 124 based on the analysis. Data modeling engine 125 analyzes various properties of the databases for generating the relational database model 124. In some embodiments, relational database model 124 is arranged in a column store format. In some embodiments, relational database model 124 is arranged in a row store format.

User or other interface 105 is a collection of one or more data input/output devices for interacting with a human user or with another data processing system to receive and output data. For example, interface 105 can be a presentation system, one or more software applications, or a data communications gateway, for example. Data flow path 132 is data communicated over interface 105 that retrieves data from or causes a change to data stored in database 108. Such changes include the insertion, deletion, or modification of all or a portion of the contents of database 108. Data output over interface 105 can present the results of data processing activities in system 100. For example, data flow path 133 can convey the results of queries or other operations performed on data modeling system 112 for presentation on a monitor or a data communications gateway.

Data store 108 is a collection of information that is stored at one or more data machine readable storage devices (e.g., data stores). Data store 108 may be a single data store or multiple data stores, which may be coupled to one or more software applications for storing application data. Data store 108 may store data as a plurality of data records. Each data record comprises a plurality of data elements (e.g., fields of a record). Data store 108 may include different structures and their relations (e.g., data store tables, data records, fields, and foreign key relations). Additionally, different structures and fields may include data types, descriptions, or other metadata, for example, which may be different for different data records. Data flow path 134 conveys information describing changes to data stored in data store 108 between data modeling system 112 and data store 108 Such changes include the insertion, deletion, and modification of all or a portion of the contents of one or more data stores.

Data modeling system 112 is a collection of data processing activities (e.g., one or more data analysis programs or methods) performed in accordance with the logic of a set of machine-readable instructions. The data processing activities can include running queries on the contents of data store 108. The results of such queries can be aggregated to yield an aggregated result set. A query is a request for information. A result set is a set of information that answers a query. An aggregated result set is a set of information from a data store that answers a query, such as from data store 108. The set of information in an aggregated result set can be, for example, a union of the results of independent queries on two or more data sets. The aggregated result sets can be conveyed to interface 105 over data flow path 133. Interface 105 can, in turn, render the aggregated result sets over an output device for a human or other user or to other systems. This output of aggregated result sets drawn from data modeling system 112, based on data from data store 108, allows system 100 to accurately portray the combination of different data sets.

Queries from the data combination engine 125 or the user interface 105 may be received by controller 130. Controller 130 may be a component on the same system as a data store or part of a different system and may be implemented in hardware, software, or as a combination of hardware and software, for example. Controller 130 receives a query from data combination engine 125 and generates one or more requests based on the received query depending on the data stores 108 and data sets that are to be accessed. Data store 108 transforms the request from controller 130 into a query syntax (e.g., SQL) compatible with the data store, and the query may specify specific tables and fields to be read from the data store.

Controller 130 receives data from data store 108. In responding to the query from data combination engine 125, controller 130 may aggregate the data of the data sets from data store 108. The aggregation may be implemented with a join operation, for example. Finally, controller 130 returns the aggregated data to data combination engine 125 in response to the query.

FIG. 2 illustrates a single table 200 in accordance with one embodiment of the present invention. Table 200 stores data for one class and all sub-classes of the class. In the illustrative example, the class is employee. Sub-classes are, for example, department, title and union status. Table 200 includes columns for all fields of all objects. If one field is only present in one class, the column is there for all the other classes as well. In those cases, the field is unused and set to null. In some embodiments, data modeling engine 125 compresses the unused values. For example, only one employee (Tim Thomas) shown in the list is a member of the union. The values for all other shown employees are null. The column of union status may be compressed.

In some embodiments, data modeling engine 125 uses index database 122 for searching for a selected object type. In some embodiments, table 200 further includes a column that includes information about the object type of a data entry for each class of the object stored in table 200. In some embodiments, the column is a bit-vector. The bit-vector indicates whether the row of table 200 belongs to the class of the vector. Data modeling engine 125 performs a logical AND of the bit vector with the corresponding class column. Data modeling engine 125 uses the bit-vector to accelerate the search on specific object types, or to sort table 200 for compression. In some embodiments, data modeling engine 125 generates a one bit vector for each transaction during transactional processing. The one bit vector defines whether the row corresponding to the vector is seen by the transaction. This provides a consistent view during transactional processing, because data modeling engine 125 may insert new rows into table 200 during parallel transactions, which may not be visible for already running transactions. Data modeling engine 125 determines the visible rows by performing a logical AND operation with the consistent view bit vector of the transaction and the bit vectors of the class.

Data modeling engine 125 may sort table 200 according to the class hierarchy resulting in all objects of the same class are next to each other in table 200. This sorting allows higher compression rates using block compression. In this instance, data modeling engine 125 compresses the null values for the higher compression.

Figure 3:
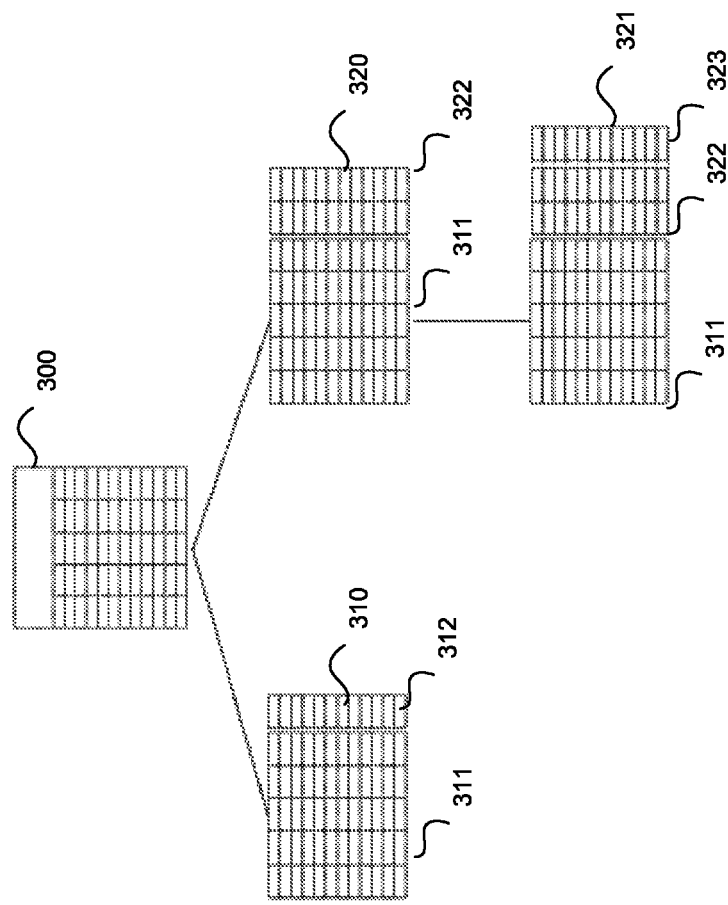
FIG. 3 illustrates example tables for a partitioned table data store according to an embodiment of the present invention.

FIG. 3 illustrates a table 300 that is partitioned into tables based on sub-classes. Main table 300 is a main table that represents the super-class for all other objects of object database 121. In the illustrative example of FIG. 3, main table 300 includes three additional partitions. Partition tables are generated for each sub-class of a class in the main table. Although the partitions are described based on class, other attributes of the objects may be used for partitioning. Each partition has a different number of columns A partition has always the same columns as its super-class partition and might add its own columns In the illustrative example of FIG. 3, a partition table 310 and a partition table 320 are partitions for sub-classes of the class represented as main table 300. A partition table 321 is a partition for a sub-class of partition table 320.

Partition table 310, partition table 320, and partition table 321 include the columns 311 of main table 300. Partition table 310 includes an additional column 312. Partition table 320 includes additional columns 322, which in the illustrative example is two different columns Partition table 321 includes columns 311 and columns 322 of partition table 320, and further includes an additional column 323. Data modeling engine 125 may generate partition table 310, partition table 320 and partition table 321 based on the inheritance of the classes and sub-classes of main table 300.

In some embodiments, the partition tables are generated based on the inheritance of a class. In some embodiments, a partition tables may be generated from more than one class or sub-class.

Figure 4:
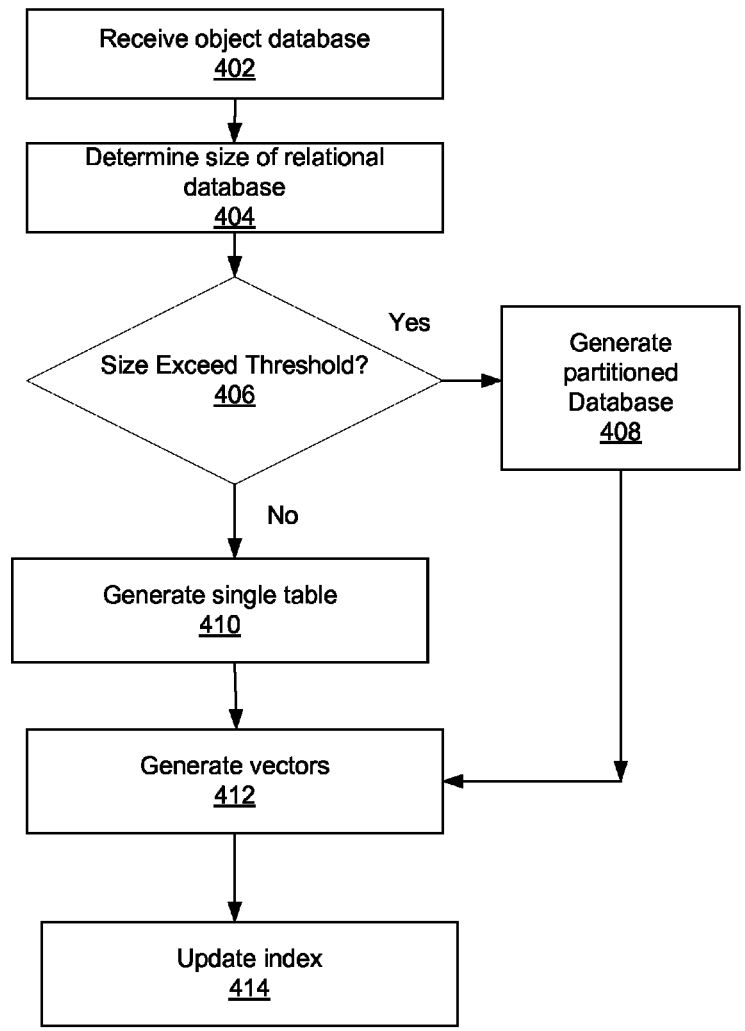
FIG. 4 illustrates a process for generating a relational database according to an embodiment of the present invention.

FIG. 4 illustrates a process for generating relational database model 124 according to an embodiment of the present invention. At 402, data modeling system 112 receives an object database 121. At 404, data modeling engine 125 determines whether the size of relational database model 124 created from object database 121 exceeds a threshold. If the size exceeds the threshold, at 408, data modeling engine 125 generates a partitioned database as described below in conjunction with FIG. 5. Otherwise, at 410, data modeling engine 125 generates a single table such as table 200. Data modeling engine 125 may generate the table 200 using the process described below in conjunction with FIG. 6. In some embodiments, data modeling engine 125 does not determine the size of the database model 124 at 406, and generates a single table at 410 regardless of the size of relational database model 124. In some embodiments, at 412, data modeling engine 125 generates vectors for the class. In some embodiments, at 414, data modeling engine 125 creates or updates index database 122.

Figure 5:
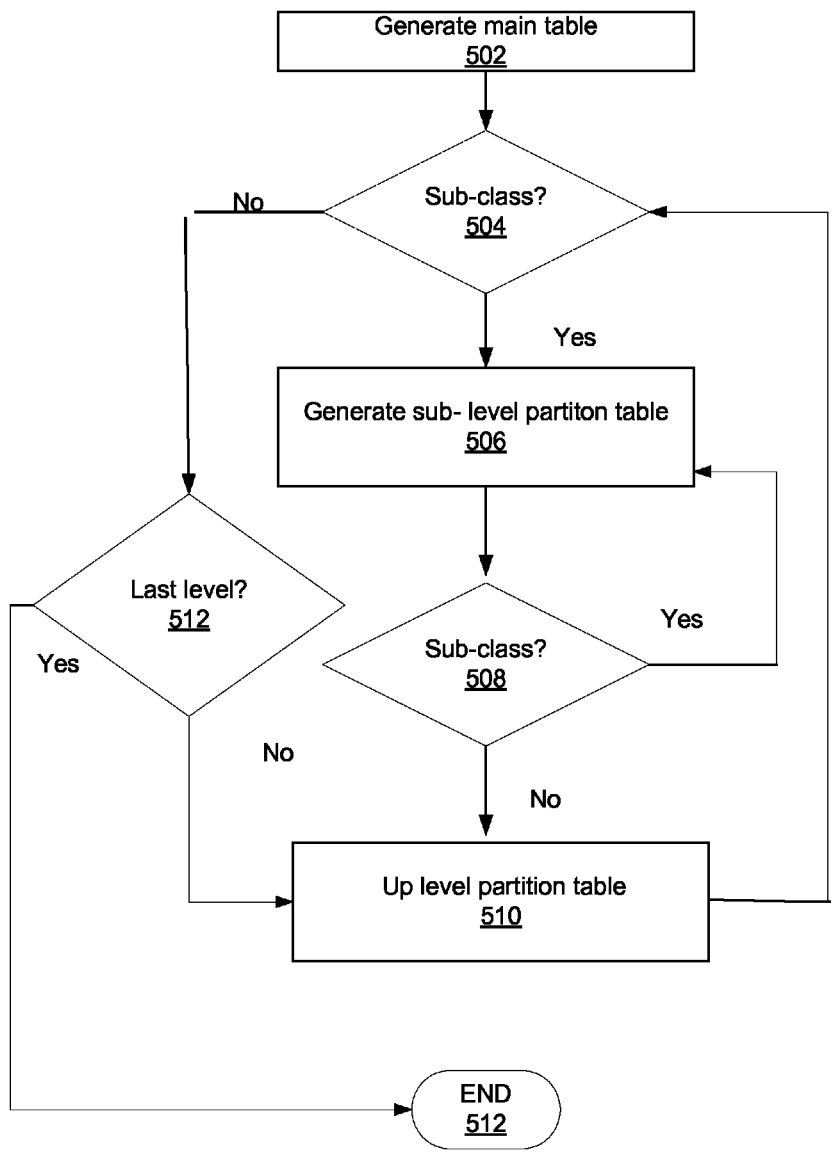
FIG. 5 illustrates a process generating multiple partition tables for a relational database according to an embodiment of the present invention.

FIG. 5 illustrates a process for generating relational database model 124 includes a multiple table according to an embodiment of the present invention. In the process of FIG. 5, data modeling engine 125 generates a main table and iteratively checks whether the table has any sub-classes and continues generating partition tables at lower levels. Data modeling engine 125 may generate the table 300 and the partition tables 310, 320 and 321 using the process described below in conjunction with FIG. 6. When a table does not have a sub-class, data modeling engine 125 moves up a level and checks the partition table. Data modeling engine 125 moves up levels as partitions are finished for the table. In an illustrative example, FIG. 5 is described for the multiple table of FIG. 3. Although FIG. 5, is described for a partition for each class, in some embodiments, the partition tables are generated based on the inheritance of a class. In some embodiments, a partition tables may be generated from more than one class or sub-class. In some embodiments, data modeling engine 125 generates a standard table instead of a partition table.

At 502, data modeling engine 125 generates a main table (main table 300). At 504, data modeling engine 125 determines whether the current table being evaluated (table 300 in the first iteration) has any sub-classes. If so, at 506, data modeling engine 125 generates a partition table (table 310 in the first instance) based on the sub-class. At 508, data modeling engine 125 determines whether the partition table generated at 506 as a sub-class. In the illustrative example, table 310 does not have any sub-classes. At 510, data modeling engine 125 increases the level of the partition table under evaluation (now table 300) and at 504 determines whether the table 300 has another sub-class. In this example, table 300 has a second sub-class, and at 506, data modeling engine 125 generates a sub-level partition table 320. At 508, data modeling engine 125 determines that table 320 has a sub-class, and at 506 generates table 321. At 508, data modeling engine 125 determines that table 321 has no sub-classes, and at 510 increases a level. At 504, data modeling engine 125 determines that table 320 has no further sub-classes. At 512, data modeling engine 125 determines that the level is not the last level. At 510, data modeling engine 125 increases the level to table 300. At 504, data modeling engine 125 determines that table 300 has no further sub-classes, and at 512, determines table 300 is the last level. At 512, data modeling engine 125 ends the generation of the table and returns to 408 (FIG. 4).

In some embodiments of FIG. 5, a hybrid partitioning may be performed. The partition tables may be partitioned when the partitioned table exceeds a threshold size. In some embodiments of FIG. 5, data modeling engine 125 may search for objects of a class and, within the same query, search for objects of a super classes, sub-classes or both.

Figure 6:
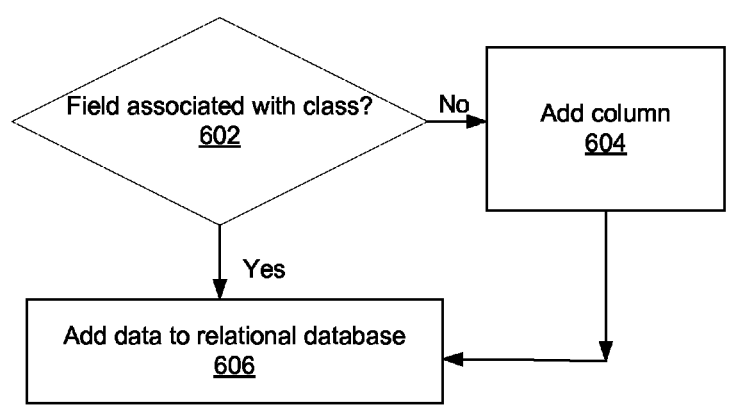
FIG. 6 illustrates a process generating a table of a relational database according to an embodiment of the present invention.

FIG. 6 illustrates a process generating a table of a relational database according to an embodiment of the present invention. At 602, data modeling engine 125 determines whether relational database 124 includes a field associated with a class of the object. If, at 602, relational database 124 does not include a field associated with the class of the object, at 604, data modeling engine 125 adds a column to relational database 124. The added column has a field corresponding to the class. In some embodiments, data modeling engine 125 stores the data for the field in metadata fields associated with the database or in index database 122. At 606, data modeling engine 125 adds the data of the object to relational database 124.

Figure 7:
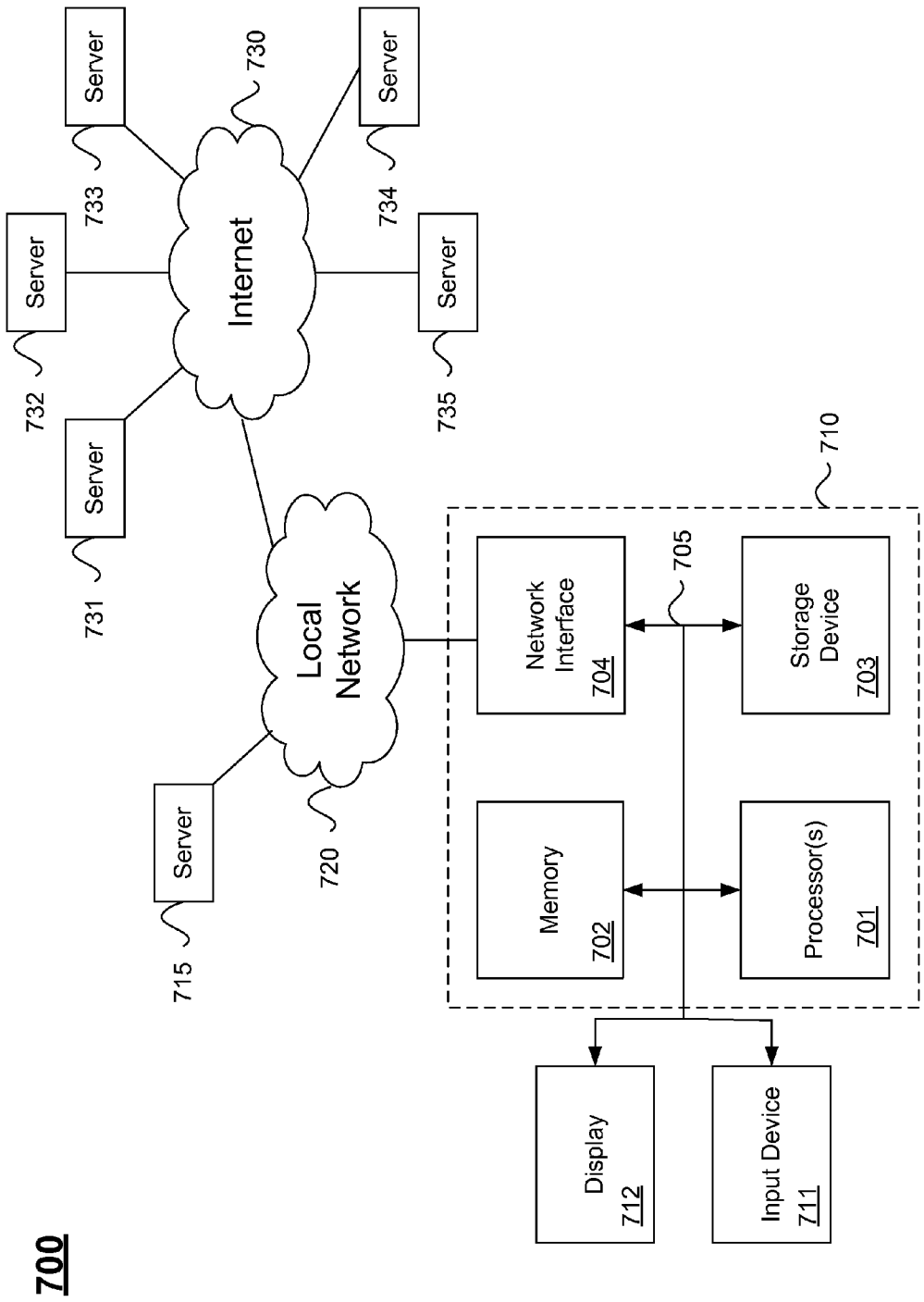
FIG. 7 illustrates hardware used to implement embodiments of the present invention.

FIG. 7 illustrates hardware used to implement embodiments of the present invention. An example computer system 710 is illustrated in FIG. 7. Computer system 710 includes a bus 705 or other communication mechanism for communicating information, and one or more processors 701 coupled with bus 705 for processing information. Computer system 710 also includes a memory 702 coupled to bus 705 for storing information and instructions to be executed by processor 701, including information and instructions for performing the techniques described above, for example. This memory may also be used for storing variables or other intermediate information during execution of instructions to be executed by processor 701. Possible implementations of this memory may be, but are not limited to, random access memory (RAM), read only memory (ROM), or both. A machine readable storage device 703 is also provided for storing information and instructions. Common forms of storage devices include, for example, a non-transitory electromagnetic medium such as a hard drive, a magnetic disk, an optical disk, a CD-ROM, a DVD, a flash memory, a USB memory card, or any other medium from which a computer can read. Storage device 703 may include source code, binary code, or software files for performing the techniques above, for example. Storage device 703 and memory 702 are both examples of computer readable mediums.

Computer system 710 may be coupled via bus 705 to a display 712, such as a cathode ray tube (CRT) or liquid crystal display (LCD), for displaying information to a computer user. An input device 711 such as a keyboard and/or mouse is coupled to bus 705 for communicating information and command selections from the user to processor 701. The combination of these components allows the user to communicate with the system, and may include, for example, user interface 105. In some systems, bus 705 may be divided into multiple specialized buses.

Computer system 710 also includes a network interface 704 coupled with bus 705. Network interface 704 may provide two-way data communication between computer system 710 and the local network 720, for example. The network interface 704 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 704 sends and receives electrical, electromagnetic, or optical signals that carry digital data streams representing various types of information.

Computer system 710 can send and receive information, including messages or other interface actions, through the network interface 704 across a local network 720, an Intranet, or the Internet 730. For a local network, computer system 710 may communicate with a plurality of other computer machines, such as server 715. Accordingly, computer system 710 and server computer systems represented by server 715 may be programmed with processes described herein. In the Internet example, software components or services may reside on multiple different computer systems 710 or servers 731-735 across the network. Some or all of the processes described above may be implemented on one or more servers, for example. Specifically, data store 108 and data combination system 112 might be located on different computer systems 710 or one or more servers 715 and 731-735, for example. A server 731 may transmit actions or messages from one component, through Internet 730, local network 720, and network interface 704 to a component on computer system 710. The software components and processes described above may be implemented on any computer system and send and/or receive information across a network, for example.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A computer-implemented method comprising:
   receiving a query, in a controller,
      wherein a data store stores data in a relational database, the database comprising a plurality of fields and a plurality of data elements, wherein each field is associated with a portion of the data elements, wherein the database is arranged as at least one table, and
      wherein the query identifies data of an object to be stored in a data set;
   determining, by a data modeling engine, whether the relational database includes a field associated with a class of the object;
   when the relational database does not include a field associated with the class of the object as determined by the data modeling engine, the data modeling engine adding a column to the relational database, the added column having a field corresponding to the class; and
   adding, by the data modeling engine, the data of the object to the relational database.

2. The method of claim 1 wherein the at least one table is a single table including all objects.

3. The method of claim 1 wherein the at least one table includes a first table and at least one second table for each sub-class of a class of the first table.

4. The method of claim 1 wherein the at least one table includes a main table and at least one partition table for each sub-class of a class of the main table.

5. The method of claim 4 wherein the at least one table includes a partition table for each sub-class of said at least one partition table.

6. The method of claim 4 wherein the at least one table includes a partition table for each sub-class of said at least one partition table, said partition table includes columns of said at least one partition table.

7. The method of claim 6 wherein the partition table for each sub-class of said at least one partition table and includes at least one additional column.

8. The method of claim 1 further comprising:
   determining whether a first table of the at least one table has a size that exceeds a threshold; and
   generating at least one partition table for each sub-class of the first table if the size of the first table exceeds the threshold.

9. The method of claim 1 further comprising generating a bit vector indicative of whether an element of the table belongs to the class.

10. The method of claim 1 further comprising compressing columns of the at least one table.

11. The method of claim 1 further comprising indexing the at least one table.

12. The method of claim 1 wherein the added column is based on the inheritance of the class.

13. The method of claim 1 wherein the database is arranged as at least one table in a column store format.

14. A computer readable medium embodying a computer program for performing a method, said method comprising:
   receiving a query, in a controller,
      wherein a data store stores data in a relational database, the database comprising a plurality of fields and a plurality of data elements, wherein each field is associated with a portion of the data elements, wherein the database is arranged as at least one table, and wherein the query identifies data of an object to be stored in a data set;

determining, by a data modeling engine, whether the relational database includes a field associated with a class of the object;

when the relational database does not include a field associated with the class of the object as determined by the data modeling engine, the data modeling engine adding a column to the relational database, the added column having a field corresponding to the class; and adding, by the data modeling engine, the data of the object to the relational database.

15. The computer readable medium of claim 14 wherein the at least one table is a single table including all objects.

16. The computer readable medium of claim 14 wherein the at least one table includes a main table and at least one partition table for each sub-class of a class of the main table.

17. A computer system comprising:
one or more processors;
a controller, the controller receiving a query,
wherein a data store stores data in a relational database, the database comprising a plurality of fields and a plurality of data elements, wherein each field is associated with a portion of the data elements, wherein the database is arranged as at least one table, and; and wherein the query identifies data of an object to be stored in a data set;

a data modeling engine determining whether the relational database includes a field associated with a class of the object;

the data modeling engine, when the relational database does not include a field associated with the class of the object as determined by the data modeling engine, adding a column to the relational database, the added column having a field corresponding to the class; and the data modeling engine adding the data of the object to the relational database.

18. The computer system of claim 17 wherein the at least one table is a single table including all objects.

19. The computer system of claim 17 wherein the at least one table includes a main table and at least one partition table for each sub-class of a class of the main table.

20. The computer system of claim 17 wherein the at least one table includes a partition table for each sub-class of said at least one partition table, said partition table includes columns of said at least one partition table.

\* \* \* \* \*